United States Patent [19]

Jones

[11] Patent Number: 4,957,830
[45] Date of Patent: Sep. 18, 1990

[54] RECHARGEABLE METAL OXIDE-HYDROGEN BATTERY

[75] Inventor: Kenneth R. Jones, Oconomowoc, Wis.

[73] Assignee: Globe-Union Inc., Milwaukee, Wis.

[21] Appl. No.: 334,361

[22] Filed: Apr. 7, 1989

[51] Int. Cl.$^5$ .......................................... H01M 12/08
[52] U.S. Cl. .................................... 429/101; 429/185
[58] Field of Search ...................... 429/101, 27, 12, 34

[56] References Cited

U.S. PATENT DOCUMENTS

| | | | |
|---|---|---|---|
| 2,914,595 | 11/1959 | Darland et al. | 429/34 |
| 3,867,199 | 2/1975 | Dunlop et al. | 136/28 |
| 3,959,018 | 6/1976 | Dunlop et al. | 136/86 |
| 4,107,395 | 8/1978 | Van Ommering | 429/21 |
| 4,112,199 | 9/1978 | Dunlop | 429/29 |
| 4,115,630 | 9/1978 | Van Ommering | 429/72 |
| 4,324,845 | 4/1982 | Stockel | 429/101 |
| 4,585,711 | 4/1986 | Vaidyanathan | 429/42 |
| 4,820,597 | 4/1989 | Lim et al. | 429/101 |

OTHER PUBLICATIONS

SAE Technical Paper Series, "Design and Study of a 15 kWh hydrogen/Nickel Oxide Battery For Photovoltaic Applications", Sindorf et al, 20th IECEC, Aug. 1985.

*Primary Examiner*—Donald L. Walton
*Attorney, Agent, or Firm*—Andrus, Sceales, Starke & Sawall

[57] ABSTRACT

A rechargeable metal oxide-hydrogen battery including an outer pressure vessel and a plurality of cell modules are disposed within the vessel. Each module is formed of a pair of back-to-back positive electrodes spaced apart by a separating layer, and a negative electrode having a hydrophilic surface is disposed adjacent each positive electrode and separated therefrom by a separator layer. An electrolyte, such as potassium hydroxide, is impregnated in the separator layers and is in contact with the positive and negative electrodes. Each module is semi-circular in planar configuration and is contained in an open-ended semi-cylindrical container formed of a polymeric material. A plurality of containers are stacked in side-by-side relation. The curved peripheral edges of the stacked containers are disposed adjacent the inner surface of the vessel, while the straight open ends of the containers are sealed and disposed in opposed relation to the sealed open ends of a second stack of module-containing containers. A plurality of metal tabs are connected to the straight edges of the positive and negative electrodes of each module and the tabs are connected by bus bars in a manner to obtain the desired voltage output for the battery. Electrical leads are connected to terminals on the battery and extend in sealed relation through a fitting in a head of the vessel to the exterior.

26 Claims, 2 Drawing Sheets

RECHARGEABLE METAL OXIDE-HYDROGEN BATTERY

BACKGROUND OF THE INVENTION

Metal oxide-hydrogen batteries, such as nickel oxide-hydrogen batteries, have seen wide use in aerospace applications. Batteries of this type are rechargeable and have an extremely long cycle life and provide a high uniform output during the entire discharge cycle.

A nickel oxide-hydrogen battery has a further advantage in that the pressure in the battery can be used as a quantitative indication of the state of charge. In addition, batteries of this type have an inherent overcharge protection.

In the typical nickel oxide-hydrogen battery, the positive electrodes are generally in the form of flat porous sintered nickel plaques, impregnated with nickel hydroxide, while the negative electrodes are formed from a thin fine mesh nickel screen having a catalyst, such as platinum, bonded to one surface of the screen through a hydrophobic polymeric material, such as polytetrafluoroethylene. On discharge of the battery, hydrogen gas diffuses through the electrolyte surrounding the catalyst surfaces of the negative plates and becomes disassociated by the catalyst to the monatomic form. The monatomic hydrogen is ionized and combines with hydroxyl ions to form water with an electron being released in the process of forming each hydrogen ion.

In addition, hydroxyl ions are formed at the positive electrode by the reaction of water with the available oxygen component of the nickel oxide. As a result of these reactions, an electron current is produced in the exterior circuit.

On recharging the reaction is reversed, with the recharging being characterized by the regeneration of hydrogen gas at the negative electrode and the reoxydation of the nickel hydroxide at the positive electrode.

Due to the gas pressures involved, the nickel oxide-hydrogen battery is contained within an outer pressure vessel.

The typical nickel oxide-hydrogen battery consists of a number of modules, each module preferably composed of a pair of back-to-back positive electrodes spaced apart by a separator layer, along with a negative electrode disposed adjacent and separated from each positive electrode. In some instances, each module is contained within a separate small pressure vessel and the modules are then connected externally in series or parallel patterns to provide the desired voltage or amperage output. In other instances, a group of modules may be contained within a single vessel and installations of this type are commonly referred to as "CPV" (common pressure vessel). In a typical CPV installation, a group of modules, which are generally rectangular in configuration, are mounted within a cylindrical pressure vessel. With this construction, there is a substantial gap or space between the sides of the battery and the inner wall of the vessel. With a nickel oxide-hydrogen battery, heat is generated in both the charging and discharging cycles and it is important that heat be transferred to the outer vessel and hence to the surrounding atmosphere. Due to the spacing of the polyhedral battery from the cylindrical vessel, heat transfer to the vessel is minimal, with the result that the performance of the battery can be adversely effected.

SUMMARY OF THE INVENTION

The invention relates to an improved rechargeable metal oxide-hydrogen battery. The battery comprises a generally cylindrical outer pressure vessel that houses two semi-cylindrical stacks or groups of cell modules. Each module is formed of a pair of back-to-back positive electrodes spaced apart by a separating layer, and a negative electrode having a hydrophilic surface is disposed adjacent each positive electrode and separated therefrom by a separator layer. An electrolyte, such as a potassium hydroxide solution, is impregnated in the separator layers and is in contact with the positive and negative electrodes.

Each module is semi-circular in planar configuration and a group of modules is contained in an open-ended semi-cylindrical container or tray, preferably formed of an electrically insulating polymeric material.

The containers are stacked in side-by-side relation to provide each semi-cylindrical stack and the curved peripheral edges of the stacked containers are disposed adjacent the inner surface of the vessel, while the straight or chordwise open ends of the containers of each stack are sealed and are disposed in opposed relation to the sealed ends of the second stack of module-containing containers.

A plurality of metal tabs are connected to the chordwise edges of the positive and negative electrodes of each module and the tabs are connected by bus bars in a manner to obtain the desired voltage or amperage output for the battery. Electrical leads are connected to terminals on the bus bars and extend in sealed relation through a fitting in the head of the vessel to the exterior.

During both the charging and discharging cycles, heat is generated in the modules and to aid in heat transfer to the vessel, a heat transfer sheet formed of a thermally conductive material is positioned flatwise between adjacent containers and the outer peripheral edge of the sheet is in contact with the inner surface of the vessel.

The chordwise end of each module, as well as the metal tabs and connecting bus bars, are sealed or encapsulated in an electrically insulating material, such as an epoxy resin and an electrically insulating sheet formed of a resilient material such as rubber, is disposed between the opposed ends of the two stacks of modules. The separating sheet, being resilient, will urge the stack outwardly into firm contact with the vessel wall to improve heat transfer to the vessel.

In a preferred form of the invention, a pair of tabs are connected to the chordwise edge of each electrode and the tabs on each positive electrode are aligned with the tabs on the other positive electrodes and the tabs on the negative electrode are aligned with the tabs on the other negative electrodes and the aligned tab can then be connected by bus bars in parallel. The tabs are arranged such that by reversing one group of electrodes, for example the positive electrodes, the tabs on the positive electrodes will then be aligned with the tabs on the negative electrodes, so that the aligned tabs can then be connected through a bus bar in series. Thus, by mere reversal of one group of electrodes, the modules can be readily connected either in parallel or series to obtain the desired voltage output.

As the stacked containers that contain the modules have a generally semi-cylindrical configuration, the outer peripheral edges of the containers are in bearing engagement with the outer vessel. This not only provides a more compact unit and eliminates dead space between the modules and the vessel, but also improves the heat transfer from the modules to the vessel, thereby improving the operational efficiency of the battery and lengthening the service life.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
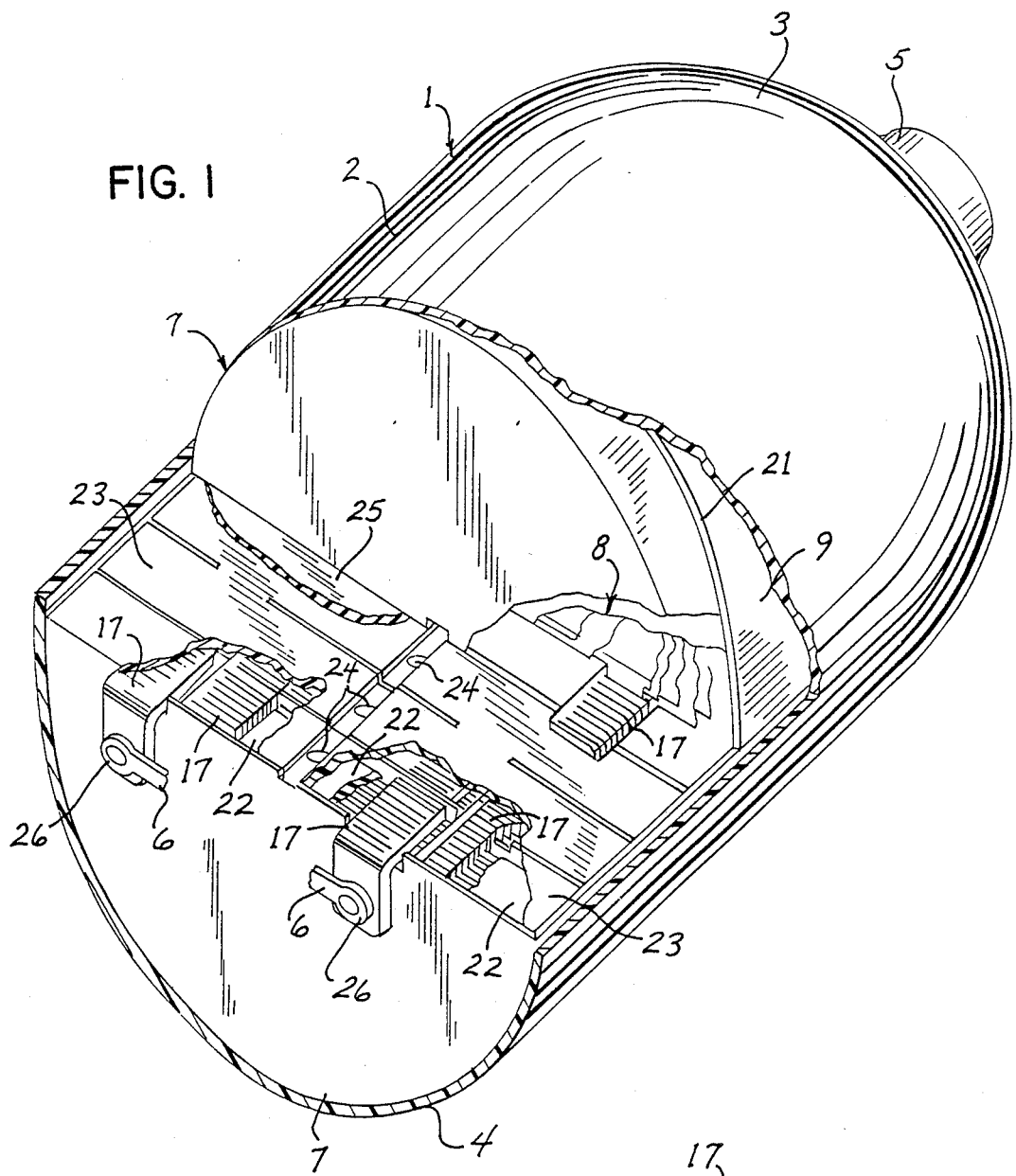
FIG. 1 is a perspective view with parts broken away of the battery of the invention.

The drawings illustrate an improved metal oxide hydrogen battery, such as a nickel oxide-hydrogen battery.

The battery includes an outer pressure vessel 1 composed of a generally cylindrical shell 2, the ends of which are enclosed by generally dome-shaped heads 3 and 4. A metal fitting 5 is mounted within an opening in one of both of the heads 3,4 and electrical leads 6, which connect the battery to an exterior circuit, extend outwardly in sealed relation through fitting 5. In certain installations, the two leads 6 will extend outwardly through one fitting 5, while in other installations a single lead will extend through each of the fittings 5 in opposite ends of the vessel.

Vessel 1 may be constructed in the manner set forth in the copending U.S. patent application Ser. No. 334,362 filed 4/7/89 and entitled Pressure Vessel Construction For A Metal Oxide-Hydrogen Battery, and the description of that patent application is incorporated herein by reference. As disclosed in the aforementioned patent application, vessel 1 comprises, in general, an inner expandable liner which is impermeable to hydrogen gas and an outer layer of fiber reinforced thermosetting resin which is capable of withstanding the internal pressures generated within vessel 1.

Figure 3:
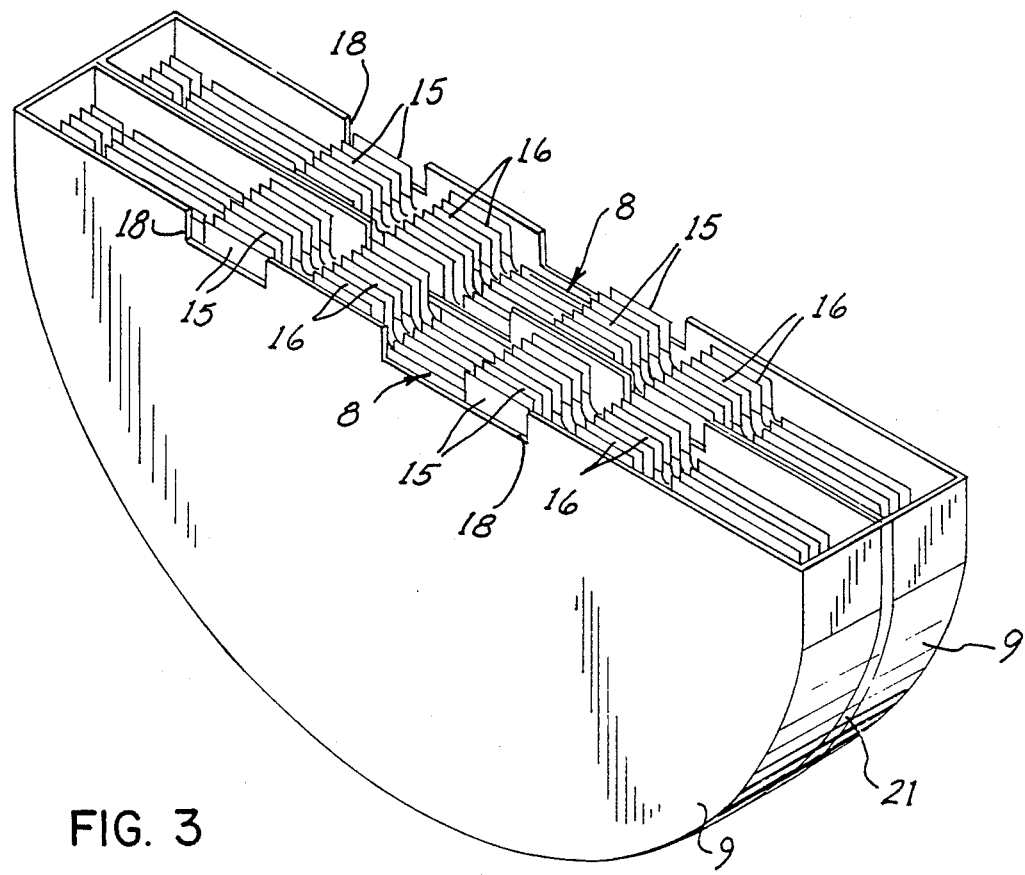
FIG. 3 is a perspective view of a pair of modules.

The present battery includes two semi-cylindrical stacks or banks 7 of cell modules 8 which are disposed in side-by-side stacked relation. A group of modules 8, as best illustrated in FIG. 3, is contained within a semi-cylindrical open-ended tray or container 9 formed of an electrically insulating polymeric material, such as polypropylene. The outer peripheral surface of tray 9 is disposed in contact with the inner surface of vessel 1.

Figure 2:
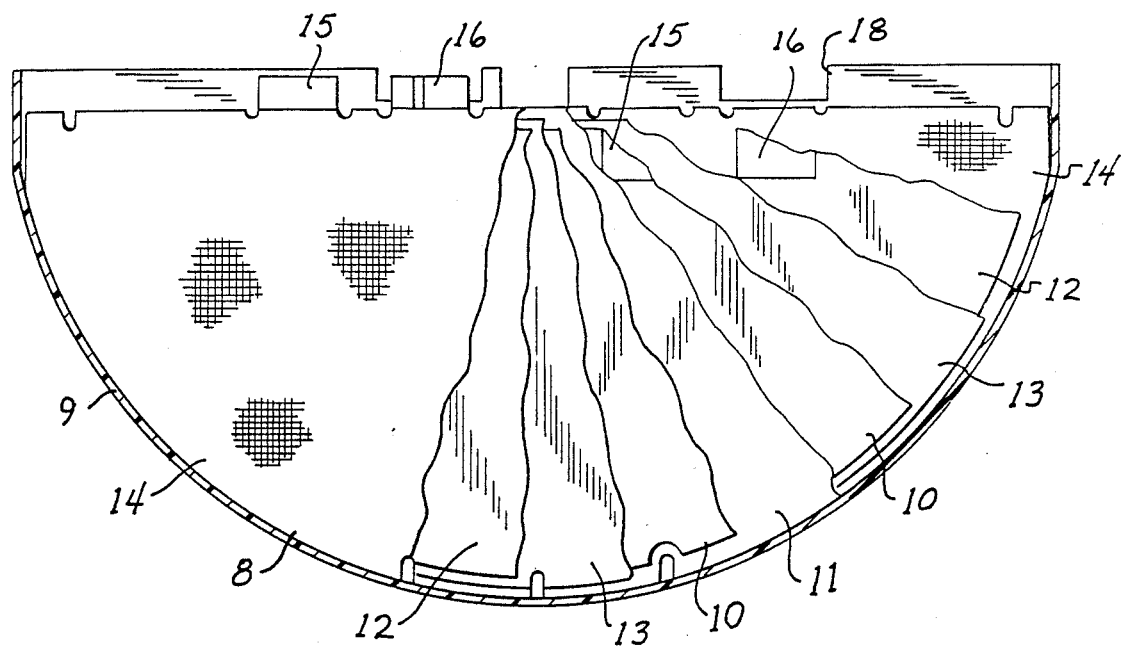
FIG. 2 is a sectional view of a module contained within a container with parts broken away in section.

Each module 8, as best illustrated in FIG. 2, includes a pair of back-to-back positive electrodes 10, which are spaced apart by a separator layer 11. A negative electrode 12 is located adjacent the opposite face of each positive electrode 10 and is separated therefrom by a separator layer 13. Diffuser screens 14 are located on the outer surfaces of the negative electrodes 12.

An electrolyte, which can take the form of a 30% solution of potassium hydroxide, is impregnated into the separator layers 11 and 13.

The construction of modules 8 is conventional and, in itself, does not form part of the present invention. The positive electrodes 10 are typically formed of sintered nickel plaques impregnated with nickel hydroxide. The plaques can be formed by pressing nickel powder and a suitable binder, such as methylcellulose, into plate form and then sintering the pressed mixture to burn off the binder so as to render the plate porous. The sintering preferably is done in a hydrogen atmosphere at a suitable temperature in the range of about 900° C. The plaques are then impregnated with nickel hydroxide by immersing the plaques in an aqueous nickel nitrate solution and then making the plaques cathodic in an aqueous potassium hydroxide electrolyte, whereby the nickel nitrate is cathodized to nickel hydroxide. The impregnated plaques are then washed to remove any residual nitrate and the nickel hydroxide is oxidized to a trivalent state by anodizing in an alkaline electrolyte, such as aqueous potassium hydroxide.

The negative electrodes 12 are typically constructed of relatively thin nickel screens coated on one side with a layer of platinum intermixed and bonded by a suitable hydrophobic plastic matrix material, such as Teflon (polytetrafluoroethylene). The hydrophobic polymeric backing avoids the loss of electrolyte due to the entrainment of the electrolyte in the hydrogen gas produced at the negative electrode during charging.

The separator layers 11 and 13 can be formed of a porous polymeric material, such as polypropylene mat, or alternately, fuel cell grade asbestos or potassium titanate can be employed.

The diffusion screens 14 can be composed of a woven polymeric material, such as woven polypropylene.

A pair of metal tabs 15, formed of nickel or the like are spot welded in spaced relation to the upper chordwise edge of each of the positive electrodes 10, and similarly a pair of metal tabs 16 are spot welded in spaced relation to the upper chordwise edge of each of the negative electrodes 12. Alternately, tabs 15 and 16 can be formed integrally with electrodes 10 and 12, respectively. The use of a pair of tabs 15,16 on each electrode provides a more efficient electrically conductive path than a single tab.

Metal connectors in the form of bus bars 17 connect the tabs 15 and 16 of the adjacent modules, and the sides of the tray 9 are notched, as indicated by 18 to permit a bus bar 17 to extend from one module group to the next. Each bus bar 17 is formed with a plurality of parallel slots 19 and the upper ends of the tabs 15,16 are secured within the slots by welding.

Figure 4:
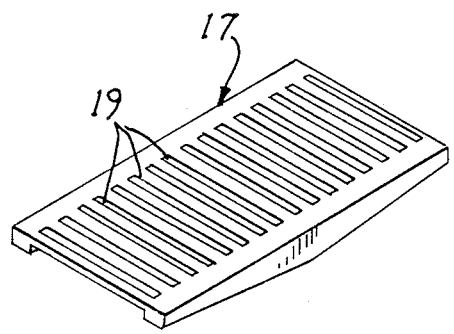
FIG. 4 is a perspective view of a bus bar or connecting strip.

As shown in FIG. 4, bus bar 17 are tapered lengthwise so that the ends of the bus bar have a lesser depth than the central section. This provides the bus bar with greater gathering power for the exit area.

Modules 8 of each semi-cylindrical stack 7 can be connected together in any arrangement to produce the desired voltage output. For example, by connecting the modules in series, a higher voltage output is produced, while connecting the modules in parallel results in a higher current output.

As a feature of the invention, the semi-circular electrodes 10 and 12 can be reversed to vary the output. For example, in one arrangement the tabs 15 of positive electrodes 10 are disposed in alignment and similarly the tabs 16 of negative electrodes 12 are also located in alignment. However, the tabs 15 and 16 are arranged so that by reversing one group of the electrodes, the tabs 15 of positive electrodes 10 will be disposed in alignment with the tabs 16 of the negative electrodes 12. This construction enables the same electrodes to be utilized in different output patterns.

To improve the transfer of heat from modules 8 to the outer vessel 1, a thin sheet 21 of a thermally conductive material is disposed flatwise between each adjacent pair of trays 9. Each sheet 21 is generally semi-circular in planar configuration and the outer peripheral edge of sheet 21 is disposed in contact with the inner surface of vessel 1. The sheet 21 can be formed of a material, such as copper, stainless steel, coated aluminum or carbon, and aids in transferring heat outwardly to the vessel 1.

As shown in FIG. 1, the chordwise end of each module 8 is enclosed by an electrically insulated protector 22 and a layer 23 of insulting material, such as an epoxy resin, is coated over the open ends of the trays 9, over the protectors 22, as well as extending over the tabs 15,16 and bus bars 17. Vent holes 24 are provided in the insulating layer 23 and communicate with the modules 8. Vent holes 24 serve as ports for the introduction of the electrolyte into the modules, as well as permitting a passage for hydrogen gas.

A sheet 25 of resilient material, such as silicone rubber, is interposed between the semi-cylindrical stacks 7. The separating sheet 25 prevents accidental shorting out between the bus bars 17 of the respective stacks 7 and also guards against vibration. As a further function, the sheet 25, due to its resiliency, acts to bias the stacks 7 outwardly into tight engagement with the inner surface of vessel 1 and enables the stacks to follow the expansion of vessel 1 under internal pressure variations.

As shown in FIG. 1, terminals 26 can be connected to the bus bars 17 located at the ends of each stack 7 and the electrical leads can be connected to the terminals. In some installations, both of the leads 6 will extend outwardly in sealed relation through fitting 5 at one end of the vessel, while in other installations one lead will extend through one fitting and the other lead will extend through the fitting in the opposite end of the vessel to the exterior.

After the stacks 7 have been assembled and the leads 6 have been connected, the vessel 1 is assembled around the stacks in the manner described in the aforementioned patent application. The interior of the vessel 1 is then evacuated by connecting a source of subatmospheric pressure, such as a vacuum pump, to a tube which is mounted within one of the fittings 5. After evacuation of the vessel, the vessel is then filled with hydrogen to a selected pressure while the positive electrode is in a discharged state. After filling with hydrogen, the tube extending through fitting 5 is sealed off to hermetically seal the interior of the vessel. The vessel will thus remain sealed at all times during charging and discharging operations.

When the fully charged cell is connected for discharge through an exterior circuit, hydrogen gas diffuses through the electrolyte surrounding the catalyst surfaces of the negative electrodes and becomes disassociated by the catalyst to the monoatomic form. The monoatomic hydrogen is ionized and combines with hydroxyl ions to form water with an electron being released in the process of forming each hydrogen ion.

Hydroxyl ions are also formed at the positive electrode by the reaction of water with the available oxygen component of the nickel oxide. As a result of these reactions and electron current is produced in the exterior circuit. On recharging, the reaction is reversed and hydrogen gas is regenerated at the negative electrode and reoxydation of the nickel hydroxide occurs at the positive electrodes.

The battery of the invention has a built-in protection against overcharging or overdischarging due to the fact that the cell is pressurized with hydrogen gas, while the positive electrodes are in a fully discharged state, and by the fact that the electrodes are not immersed in the electrolyte. Using a limited amount of electrolyte facilitates diffusion of hydrogen and oxygen for reaction.

Due to the semi-cylindrical shape of the module stacks 7, the outer peripheral edges of the modules are in close proximity to the interior wall of vessel 1, thus providing a more compact unit as opposed to prior constructions where a polyhedral cell was housed within a cylindrical outer vessel. Not only does this construction provide a space savings which is critical in aerospace applications, but it also improves the heat transfer from the modules to the vessel, thus improving the operational effectiveness of the battery and increasing its service life.

Various modes of carrying out the invention are contemplated as being within the scope of the following claims particularly pointing out and distinctly claiming the subject matter which is regarded as the invention.

I claim:

1. A rechargeable metal oxide-hydrogen battery, comprising an outer generally cylindrical pressure vessel, a plurality of cell modules disposed within the vessel, each module comprising a pair of back-to-back positive electrodes, a first separating layer disposed between said positive electrodes, a negative electrode disposed adjacent each positive electrode, a second separator layer disposed between each negative electrode and the adjacent positive electrode, an electrolyte impregnated within said separator layers and in contact with said electrodes, each module being generally semi-circular in planar configuration and including a semi-circular peripheral edge disposed adjacent the inner surface of said vessel and a generally diametral edge connecting opposite ends of said semi-circular edge, and connecting means for connecting said electrodes in an external electrical circuit.

2. The battery of claim 1, wherein a plurality of modules are disposed in side-by-side relation to provide a stack, and said battery includes module separating means for separating modules in said stack.

3. The battery of claim 1, and including a plurality of metallic tabs disposed on the diametral edge of each positive and negative electrode and connected to said connecting means.

4. The battery of claim 2, wherein said separating means comprises a semi-cylindrical electrically insulating container to contain at least one module.

5. The battery of claim 4, wherein said container has an open end and the diametral edge of said module is disposed adjacent said open end, said battery also including sealing means for sealing the diametral edge of said module.

6. The battery of claim 5, wherein said vessel is provided with a generally dome-shaped head, said connecting means extending in sealed relation through said head.

7. The battery of claim 1, and including a second module having a configuration similar to the first module, the diametral edges of said modules being disposed in opposed relation.

8. The battery of claim 7, and including a sheet of resilient insulating material disposed between the opposed edges of said modules for urging the modules outwardly into contact with said vessel.

9. A rechargeable nickel-hydrogen battery, comprising a generally cylindrical pressure vessel, a pair of module stacks disposed within said vessel, each module including a pair of back-to-back positive electrodes, a first porous separator layer disposed between said positive electodes, a negative electrode having a hydrophobic surface disposed adjacent each positive electrode, a second porous separator layer disposed between each negative electrode and the adjacent positive electrode, an electrolyte impregnated in said separator layers and in contact with said electrodes, the modules of each stack being disposed in side-by-side stacked relation and each module being generally semi-circular in planar configuration and including a semi-circular peripheral edge disposed adjacent the inner surface of said vessel and a generally diametral edge connecting opposite ends of said semi-circular edge, the diametral edges of the modules of one stack disposed in opposed facing relation to the diametral edges of the modules of the second stack, electrical insulating means for separating modules of each stack, and connecting means for connecting said modules in an external electrical circuit.

10. The battery of claim 9, wherein said insulating means is a resilient material.

11. In a metal oxide-hydrogen battery, an outer generally cylindrical vessel, a pair of semi-cylindrical stacks of cell modules disposed within the vessel, the modules in each stack being disposed in side-by-side stacked relation, each stack being semi-cylindrical in shape and having an outer curved surface disposed adjacent the inner surface of said vessel and having a second surface connecting ends of said peripheral surface, said second surfaces of said stacks being disposed in opposed relation, biasing means disposed between the opposed second surfaces the biasing the stacks in a direction away from each other and into contact with said vessel.

12. The battery of claim 11, and including separating means for separating modules in each stack.

13. The battery of claim 12, wherein said separating means comprises an open ended generally semi-cylindrical container to contain at least one module.

14. The battery of claim 13, wherein said container is composed of polymeric material.

15. The battery of claim 11, wherein each module includes a plurality of thin plate-like positive electrodes, a plurality of thin plate-like negative electrodes and separator layers disposed between said electrodes, said module also including an electrolyte impregnated within said separator layers.

16. The battery of claim 15, wherein said positive electrodes are disposed in back-to-back relation and separated by one of said separator layers.

17. The battery of claim 11, wherein said biasing means comprises a sheet of resilient electrically insulating material disposed between the opposed second surfaces.

18. The battery of claim 17, wherein said sheet is composed of rubber-like material.

19. A rechargeable metal oxide-hydrogen battery, comprising an outer generally cylindrical pressure vessel, a plurality of cell modules disposed within the vessel, each module comprising a pair of back-to-back positive electrodes, a first separating layer disposed between said positive electrodes, a negative electrode disposed adjacent each positive electrode, a second separating layer disposed between each negative electrode and the adjacent positive electrode, an electrolyte impregnated within said separating layers and in contact with said electrodes, each module being generally semi-circular in planer configuration and including a semi-circular peripheral edge disposed adjacent the inner surface of said vessel and a generally diametral edge connecting opposite ends of said semi-circular edge, connecting means for connecting said electrodes in an external electrical circuit, and a metallic heat transfer member disposed between adjacent modules and having a peripheral edge disposed in contact with said vessel.

20. In a metal oxide-hydrogen battery an outer generally cylindrical vessel, a pair of semi-cylindrical stacks of cell modules disposed within the vessel, the modules in each stack being disposed in side-by-side stacked relation, each stack being semi-cylindrical in shape and having an outer curved surface disposed adjacent the inner surface of said vessel and having a second surface connecting ends of said peripheral surface, said second surfaces of said stacks being disposed in opposed relation, and a heat transfer member disposed between adjacent modules and having a generally curved outer edge disposed in engagement with the inner surface of said vessel.

21. The battery of claim 20, wherein said heat transfer member comprises a metal sheet.

22. In a cell module for a rechargeable metal oxide-hydrogen battery, a plurality of sheet-like positive electrodes, a group of sheet-like negative electrodes, a group of porous separator layers disposed between said electrodes, and an electrolyte impregnated within said separator layers and in contact with said positive and negative electrodes, said electrodes being generally semi-circular in planar configuration and including an outer curved peripheral edge and a chordwise edge, a pair of tabs disposed on the chordwise edge of each electrode, said tabs being arranged, such that when in a first position, the tabs on the positive electrodes are aligned and the tabs on the negative electrodes are aligned and by reversing one of said electrode groups, the tabs on the positive electrodes are aligned with the tabs on the negative electrodes.

23. The module of claim 22, wherein the tabs are disposed in spaced relation on the respective chordwise edges of the electrodes.

24. The module of claim 22, and including an electrically conductive connecting strip connecting the aligned tabs.

25. The module of claim 24, wherein said conducting strip is provided with a plurality of parallel slots to receive the aligned tabs.

26. The module of claim 25, wherein said strip is tapered lengthwise to provide the ends of the strip with a lesser thickness than the central portion of the strip.

* * * * *